United States Patent

[11] 3,597,782

| [72] | Inventor | Robert C. Quackenbush<br>Glendale, Calif. |
|------|----------|-------------------------------------------|
| [21] | Appl. No. | 786,174 |
| [22] | Filed | Dec. 23, 1968 |
| [45] | Patented | Aug. 10, 1971 |
| [73] | Assignee | Arthur B. Quackenbush<br>Glendale, Calif.<br>a part interest |

[54] POSITIVE FEED AND POSITIVE RETRACT TAPPING DEVICE
11 Claims, 6 Drawing Figs.

[52] U.S. Cl. .................................................. 10/136,
10/139, 77/34.4, 77/34.7
[51] Int. Cl. .................................................. B23g 1/00,
B23q 5/32
[50] Field of Search ........................................ 10/129,
136, 136.1, 139; 77/32.1, 32.8, 32.9, 33.8, 34.4, 34.7

[56] References Cited
UNITED STATES PATENTS

| 2,501,298 | 3/1950 | Winchell | 10/139 |
| 3,134,996 | 6/1964 | Retz | 10/139 |
| 3,411,385 | 11/1968 | Quackenbush | 10/139 |
| 3,430,524 | 3/1969 | Thomas | 77/34.4 |
| 3,460,172 | 8/1969 | Snyder | 77/34.4 |
| 3,487,729 | 1/1970 | Juhasz et al | 77/34.4 |
| 3,512,433 | 5/1970 | Juhasz et al | 77/34.7 |
| 3,512,434 | 5/1970 | Juhasz et al | 77/34.7 |
| 2,869,403 | 1/1959 | Bent | 77/34.4 |

*Primary Examiner*—Charles W. Lanham
*Assistant Examiner*—E. M. Combs
*Attorney*—Mahoney, Hornbaker and Schick ABSTRACT: An aligned and connected spindle and lead screw are rotatably and axially movably mounted in a housing, the lead screw being engaged by a housing stationary nut so that rotation of the assembly in one direction moves the same axially in a feed stroke and in the other direction moves it axially in a retraction stroke. A spline connected sleeve telescopes the spindle and mounts spindle gears axially stationary and rotatable for driving the spindle and lead screw. The spindle gears are operably engaged by aligned clutch gears which are, in turn, alternately engaged and driven by a countershaft mounted clutch, the one clutch gear and clutch driving the spindle and lead screw in the one direction of rotation and the other clutch gear and clutch driving the spindle and lead screw in the other direction of rotation. A partially governor controlled drive motor is connected to the clutch through the countershaft, the drive motor being governor controlled for selective constant speed during the spindle and lead screw lead stroke and being free of governor control for high speed during the spindle and lead screw retraction stroke.

Patented Aug. 10, 1971
3,597,782
3 Sheets-Sheet 1
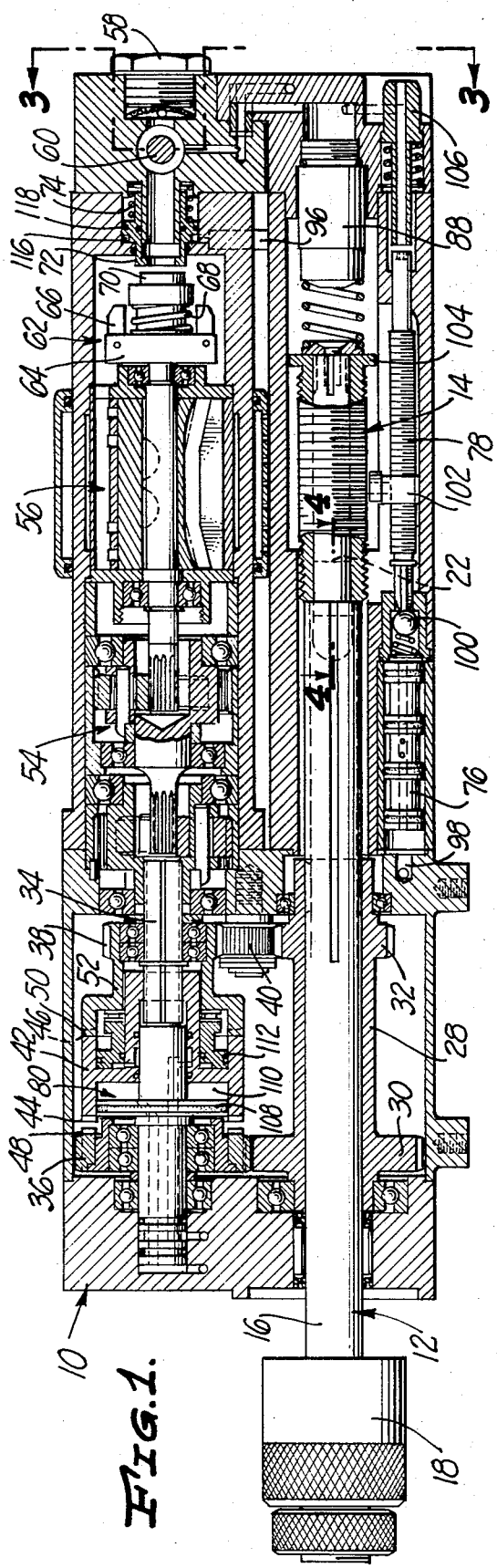
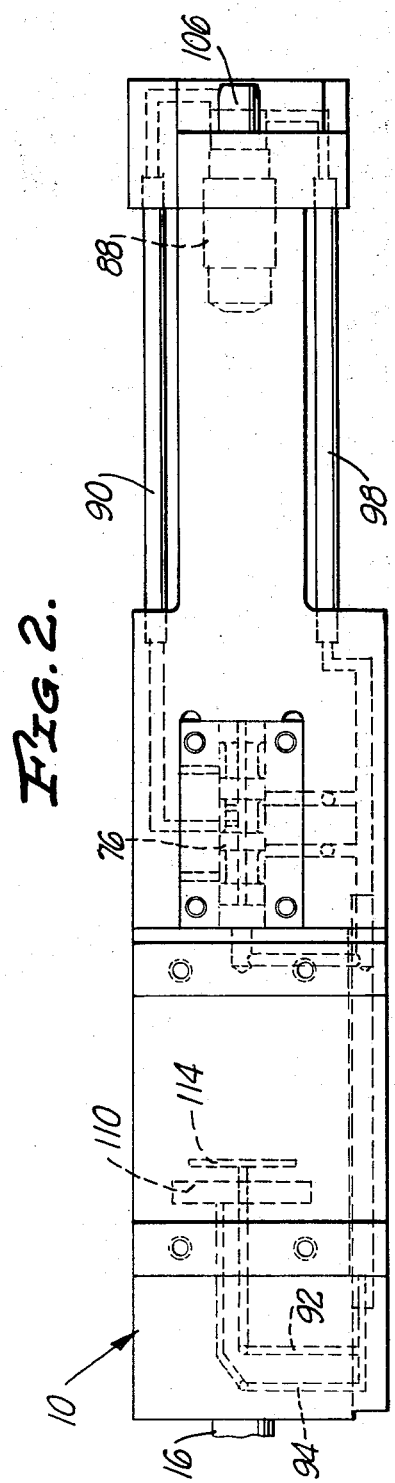
INVENTOR
ROBERT C. QUACKENBUSH
BY
MAHONEY, HORNBAKER
& SCHICK
ATTORNEYS Patented Aug. 10, 1971
3,597,782
3 Sheets-Sheet 2
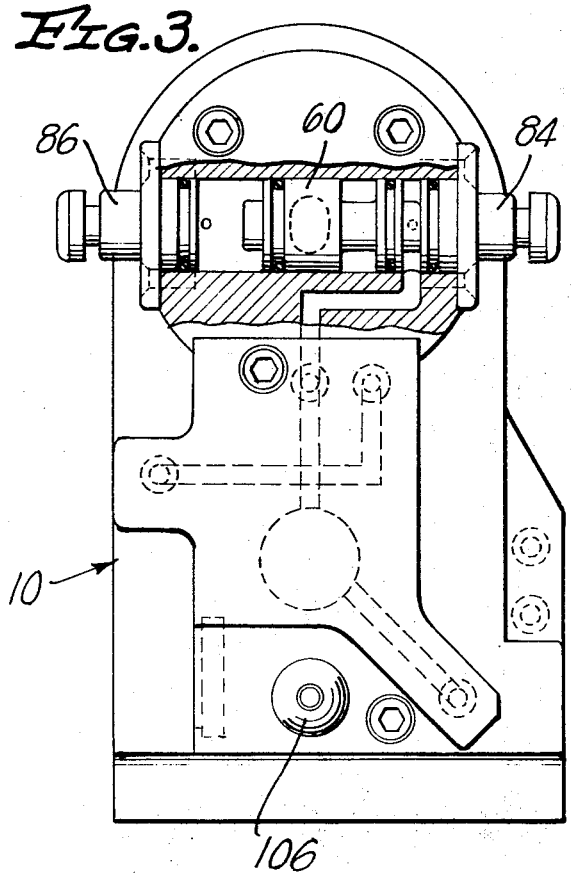
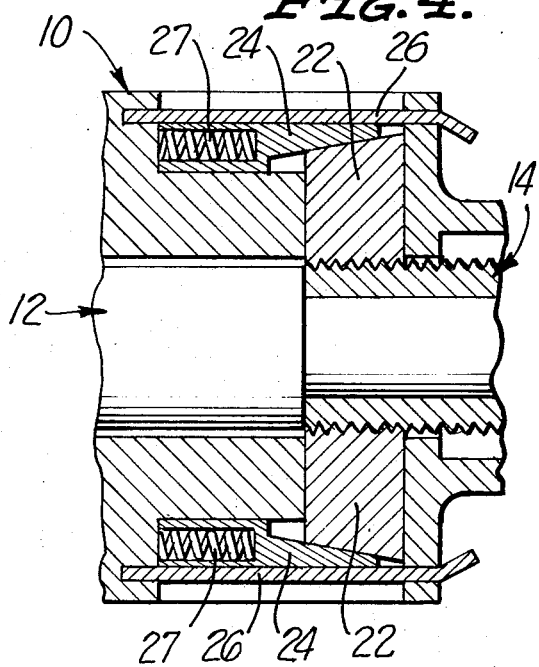
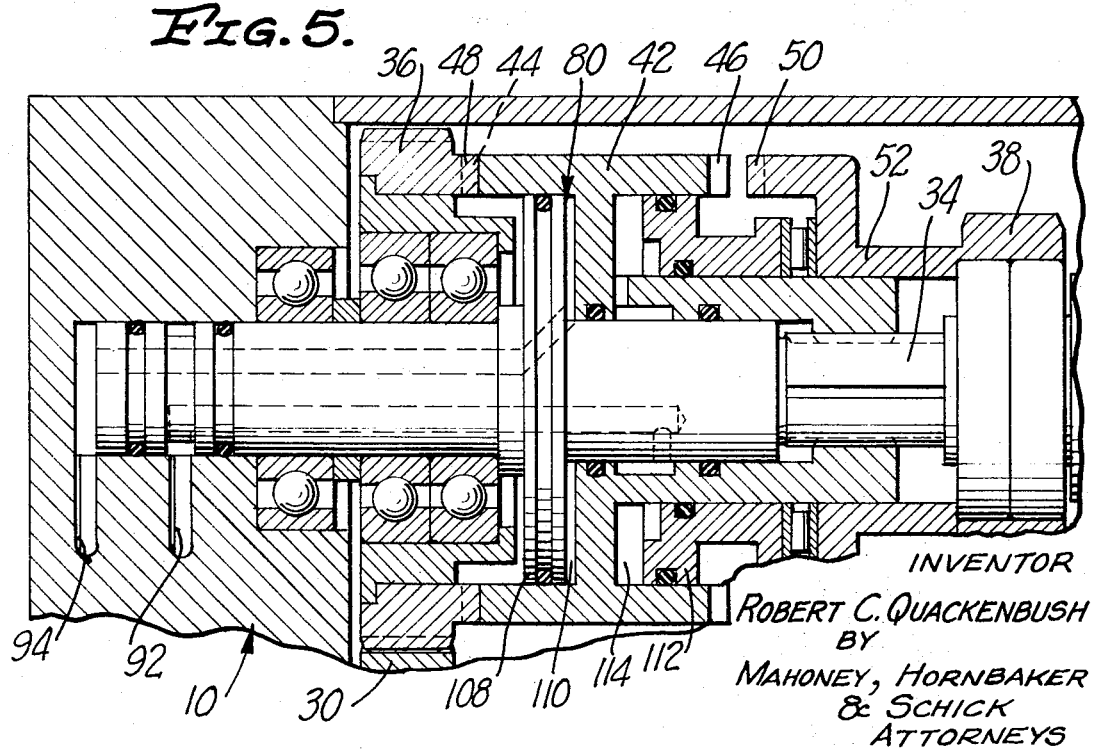
INVENTOR
ROBERT C. QUACKENBUSH
BY
MAHONEY, HORNBAKER
& SCHICK
ATTORNEYS

INVENTOR
ROBERT C. QUACKENBUSH
BY
MAHONEY, HORNBAKER
& SCHICK
ATTORNEYS

POSITIVE FEED AND POSITIVE RETRACT TAPPING DEVICE

BACKGROUND OF THE INVENTION

This invention relates to a positive feed and positive retract tapping device wherein the spindle thereof, and therefore the tap rotatably and axially driven by said spindle, is positively driven rotatably and axially in both a forward feed stroke and a rearward retraction stroke so as to provide an improved thread cutting operation free of tearing and distortion of the threads being cut. Furthermore, this invention relates to a tapping device of the foregoing general character wherein the spindle speed is preferably governor controlled at a proper lower tapping speed during the spindle feed stroke and it is free of said governor control for higher speed during the retraction stroke. Also, the tapping device of the present invention preferably includes a complete automatic control mechanism carrying out proper actuation of the various components throughout the feed and retraction strokes once the feed stroke has been started and until the retraction stroke is completed, said control mechanism additionally preferably including both emergency stop and emergency retraction controls.

Various prior forms of tapping devices have heretofore been provided, many of which are capable of moving taps in automatic feed and retraction strokes. One of the principal difficulties with these prior tapping devices has been occasioned by the fact that although the taps are normally positively driven, both rotatably and axially, in the feed strokes for cutting the threads to be formed thereby, such taps are normally free floating or freely rotatable during the retraction strokes thereof. In other words, as the spindles of the tapping devices upon which the thread cutting taps are mounted are reversed in rotational direction to retract such spindles and thereby withdraw the taps from the threads which have been cut, the taps are automatically released from drive by the spindles so that they are free floating and reverse thread from the cut threads merely as a result of axial urging of the same by the spindles moving in their retraction strokes.

As a consequence, with these prior tapping devices, the entire force for reverse threading of the taps during the spindle retraction stroke is provided by the threads cut by the tap during the feed stroke, the axial resistance of the cut threads being required to be translated into rotational motion of the tap in order to carry out such tap reverse threading retraction. Such requirement, therefore, results in the further requirement that the cut threads must be of a predetermined minimum strength in order for the tapping operations to be carried out by these prior tapping devices and even with such known predetermined requirements, a certain number of the cut threads are damaged by either tearing or inordinate deforming caused solely by these retraction forces which must be generated. Furthermore, even under the most ideal conditions, relatively wide thread tolerances must be permitted to prevent such thread damage and permit the carrying out of the overall tapping operation.

A still further important consideration with the prior tapping devices, and particularly where the same are provided with automatic control mechanisms for automatically controlling the same through a feed and retraction stroke is occasioned by the fact that the control mechanism of these prior tapping devices have been relatively complicated and massive requiring that the overall tapping device units will be similarly massive and difficult of use. The complications of the automatic control mechanisms have also created difficult and troublesome maintenance problems in order to maintain the same properly workable over a relatively long period of production use. Thus, there has been a long felt want and need in the various industries using the tapping devices for tapping devices of greater simplicity and compactness while still providing efficient automatic control thereof.

OBJECTS AND SUMMARY OF THE INVENTION

It is, therefore, an object of this invention to provide a positive feed and positive retract tapping device wherein the spindle and tap thereof are rotatably and axially positively driven both in a forward feed stroke and a rearward retraction stroke, the threads cut thereby not being a factor in supplying any rotational motion for the tap during the retraction stroke. The spindle and, therefore, the spindle driven tap, are maintained under positive rotational and axial driving by the same lead screw threads throughout both the feed and retraction strokes so that the threads cut by the tap are never required to supply any of the forces for removal of the tap during the retraction stroke. Damage to the cut threads is thereby prevented and the threads will remain in the exact form as cut, not possible with the prior tapping devices as hereinbefore discussed.

It is a further object of this invention to provide a positive feed and positive retract tapping device having the foregoing unique attributes which is of greatly simplified construction and maximum compactness so as to be easier of use and capable of tapping operations where have heretofore been considered inaccessible for automatic tapping devices of the type herein involved. In the preferred form of the present invention, the spindle and lead screw of the device are secured together operable as a single unit so that cumbersome motion transfer mechanisms are not required. Furthermore, the rotational drive for the spindle and lead screw unit is preferably provided through a telescoping sleeve in both directions of rotational and axial movement, again eliminating many of the cumbersome motion transfer mechanism required in the prior constructions.

It is still a further object of this invention to provide a positive feed and positive retract tapping device of the foregoing character and preferably having the unique characteristic of being positively driven in the feed stroke at a proper slower tapping speed, yet driven at a much higher speed during the retraction stroke with the switching therebetween being automatic in a simplified manner. During the feed stroke, the speed of the spindle is preferably governor controlled as to be maintained at a proper slower tapping rate and virtually constant throughout said feed stroke. At the termination of such feed stroke, however, the rotation of the spindle is not only automatically reversed at the proper predetermined instant, but at the same time, the speed of such spindle is greatly increased so as to provide a high speed overall retraction stroke, despite the positive spindle drive throughout both of said feed and retraction strokes.

It is also an object of this invention to provide a positive feed and positive retract tapping device having all of the foregoing distinct advantages over the prior constructions wherein the automatic control mechanisms for the automatic control thereof during the feed and retraction strokes is of maximum simplicity, while still being positively acting and of maintenance free dependability. The drive motor for the tapping mechanism is preferably a fluid drive motor and the control mechanisms thereof are likewise of simplified, fluid control form making use of a series of fluid spool-type cylinders which are virtually maintenance free. Even with this greatly simplified, fluid actuated control arrangement, it has been possible to integrate therein highly desirable emergency stop and emergency retract controls selectively operable in the event of any malfunctioning which may arise during continuous automatic operation.

Other objects and advantages of the invention will be apparent from the following specification and the accompanying drawings which are for the purpose of illustration only.

BRIEF DESCRIPTION OF THE DRAWINGS

FIG. 1 is a vertical sectional view of an embodiment of tapping device incorporating the principles of the present invention, said tapping device being illustrated positioned intermediate a retraction stroke;

FIG. 2 is a fragmentary, bottom plan view of the tapping device of FIG. 1;

FIG. 3 is an enlarged, end elevational view, with parts thereof broken away and in section, looking in the direction of the arrows 3-3 in FIG. 1;

FIG. 4 is an enlarged, fragmentary sectional view looking in the direction of the arrows 4-4 in FIG. 1;

FIG. 5 is an enlarged, fragmentary, vertical sectional view taken from the upper left-hand portion of FIG. 1 and illustrating certain of the drive mechanism of the tapping device shifted for driving said tapping device in a feed stroke thereof.

DESCRIPTION OF THE BEST EMBODIMENT CONTEMPLATED

Figure 6:
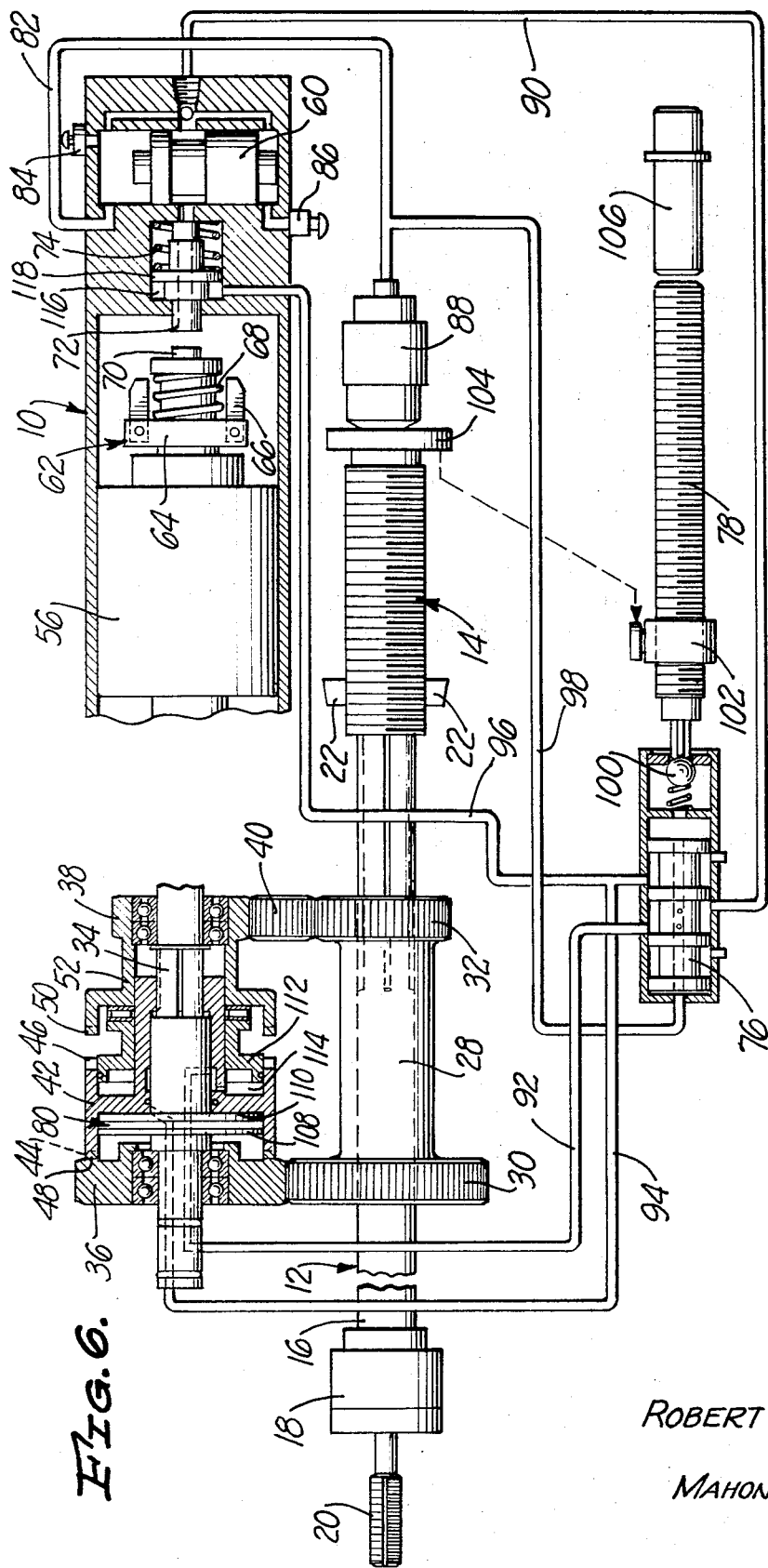
FIG. 6 is a fragmentary, somewhat diagrammatic view, part in section illustrating the tapping device of FIG. 1 during the feed stroke thereof.

Referring to the drawings, the embodiment of the tapping device of the present invention illustrated therein includes a housing generally indicated at 10 rotatably and axially movably mounting a spindle generally indicated at 12 and an axially aligned and connected lead screw generally indicated at 14. A forward end 16 of the spindle 12 projects at all times forwardly from the housing 10 and has mounted thereon a chuck 18 for, in turn, mounting a tap 20, it being important that the chuck will always retain the tap firmly and nonrotatably relative to the spindle and lead screw for reasons to be hereinafter apparent. The spindle 12 and the lead screw 14 being rotatably and axially secured are movable together with the spindle projecting progressively greater distances forwardly from the housing 10 during a spindle feed stroke and telescoping progressively greater distances rearwardly into said housing during a spindle retraction stroke, the spindle and lead screw being shown in FIG. 1 closely approaching a fully retracted position within the housing and nearing the completion of the retraction stroke.

A series of quarter nuts 22 are mounted stationary in the housing 10 peripherally threadably engaged with the lead screw 14 for threadably urging the lead screw and spindle 12 forwardly with the spindle moving progressively from the housing upon rotation of the spindle and lead screw in one direction and urging the spindle and lead screw in the opposite direction with the spindle telescoping progressively into the housing upon rotation of the spindle and lead screw in the opposite direction. As shown in FIG. 4, the quarter nuts 22 are removably retained in the housing 10 by appropriate cams 24 and holders 26 permitting selectively removable and replacement of the quarter nuts by different quarter nuts conforming to different lead screws 14 in order that the pitch of the lead screw and quarter nut threads will conform exactly to the pitch of the threads on the tap 20 being used and, therefore, the threads to be cut.

Still referring to FIG. 4, springs 27 constantly urge the cams 24 axially wedged between the quarter nuts 22 and the holders 26, thereby always retaining and urging the quarter nuts both axially and radially into an engagement with the lead screw 14. This arrangement results in a tight engagement at all times between the lead screw and quarter nut threads in both axial directions of movement of the lead screw 14 relative to the quarter nuts 22. Furthermore, the constant resilient urging of the springs 27 maintaining such engagement automatically takes up any wear between the threads of the lead screw 14 and the quarter nuts 22 so that it is impossible for any back lash to occur therebetween from such wear.

The forward and rearward axial movements of the spindle 12 in the forward feed and rearward retraction strokes are, therefore, totally and completely controlled by the lead screw 14 and quarter nuts 22 and maintained in absolute synchronization with the corresponding tap 20 by virtue of the arrangement thereof just described. Thus, the spindle 12 totally controls the forward and rearward movements of the tap 20 both in the feed stroke during the cutting of the threads by the tap and in the retraction stroke during the retraction of the tap from the threads just cut, thereby constituting total positive feed and positive retraction control resulting in virtually optimum perfect thread cutting.

Rotation of the assembly of the spindle 12 and lead screw 14 is provided by a sleeve 28 rotatably mounted in the housing 10 axially stationary and telescoped over the spindle 12. The sleeve 28 is spline connected to the spindle 12 as shown in FIGS. 1 and 6 so as to transmit rotational drive from the sleeve to the spindle while permitting axial movement of the spindle and lead screw 14 relative to said sleeve. A spindle feed gear 30 is secured to a forward portion of the sleeve 28 surrounding the spindle 12 and a spindle retraction gear 32 is secured to a rearward portion of the sleeve surrounding the spindle, both gears preferably being formed integrally with said sleeve.

A countershaft 34 is rotatably mounted in the housing 10 axially stationary relative thereto with a clutch feed gear 36 being rotatably mounted on a countershaft forward portion and a clutch retraction gear 38 being mounted on a countershaft rearward portion, both said clutch gears likewise being axially stationary while being free for relative rotation with respect to said countershaft. The clutch feed gear 36 is permanently drivingly engaged with the spindle feed gear 30 and the clutch retraction gear 38 is permanently drivingly engaged with the spindle retraction gear 32 through a reversing motion idler gear 40. Rotation of the clutch feed gear 36 in a given direction thereby through the spindle feed gear 30 rotates the spindle 12 in the one or tapping direction to move the spindle and lead screw 14 axially forwardly in the feed stroke and rotation of the clutch retraction gear 38 in the same given direction causes opposite rotation of the spindle 12 through the idler gear 40 and spindle retraction gear 32 to move the spindle and lead screw in the rearward retraction stroke.

A clutch driving member 42 is spline connected to the countershaft 34 so as to be rotatably driven by the countershaft while being axially shiftable relative thereto, said clutch driving member having forward feed ratchet teeth 44 and rearward retraction ratchet teeth 46 formed thereon. The clutch driving member 42 is positioned axially shiftable on the countershaft 34 axially between the clutch feed and retraction gears 26 and 38. When the clutch driving member 42 is shifted to a forward feed position as shown in FIGS. 5 and 6, the forward feed ratchet teeth 44 thereof engage the feed gear ratchet teeth 48 secured on the clutch feed gear 36, and when said clutch driving member is shifted to a rearward retraction position as shown in FIG. 1, the rearward retraction ratchet teeth 46 thereof engage with retraction gear ratchet teeth 50 formed on a rearward extension 52 of the clutch retraction gear 38. Thus, the clutch driving member 42 alternately rotatably drives the clutch feed and retraction gears 36 and 38 depending on the positioning of said clutch driving member in its alternate forward feed and rearward retraction positions, in either case, the rotational drive resulting from the countershaft 34.

The countershaft 34 is, in turn, rotatably driven through a series of conventional axially aligned, planetary gear systems generally indicated at 54 by a somewhat usual fluid, preferably air, drive motor 56 mounted at a rearward portion of the housing 10. The fluid or air supply for the drive motor 56 is received through a main fluid inlet 58, through a main fluid control spool valve 60 forming a part of a control system to be hereinafter described, and through a portion of a governor generally indicated at 62. The governor 62 includes a reciprocal control part 64 connected to the drive motor 56 for rotation therewith, the reciprocal position of this control part being determined by the rotational speed of the drive motor in the usual manner of normal governors. In other words, as the rotational speed of the drive motor 56 increases, weights 66 are urged radially outwardly by centrifugal force against reverse urging by a coil spring 68 tending to move a plug 70 rearwardly as shown in FIGS. 1 and 6, and decreases in drive motor rotational speed permits the coil spring to overcome the centrifugal force on the weights and move the plug forwardly.

The governor 62 also includes a selectively shiftable orifice part 72 in fluid communication with the main fluid control spool valve 60, said orifice part normally being urged fully forwardly into a speed control position by a coil spring 74, but selectively shiftable rearwardly to a noncontrolling position. Thus, when the orifice part 72 is in its forward speed controlling position, fluid or air therethrough and to the fluid drive motor 56 is controlled by the plug 70 of the reciprocal control part 64 so as to maintain the speed of the drive motor at a relatively constant speed reduced a determined amount from full speed thereof. When, however, the orifice part 72 is shifted rearwardly to its rearward noncontrolling position, the air flow therethrough is no longer affected by the reciprocal control part 64 and the drive motor 56 is supplied with a maximum of air to drive the same at maximum high speed.

The automatic control system for the tapping device of the present invention includes the previously mentioned main fluid control spool valve 60, a reversing fluid control spool valve 76, a reverse control rod 78 and a clutch control assembly generally indicated at 80. The spool valves 60 and 76 are of the type containing reciprocal spools therein, said spools being retained in alternate positions of the valves by fluid or air pressure maintained in the valve ends, but when an opposite end of the valves is bled of air, that is, the opposite end of the valve from the then positioning of the spool, the spool will be moved reciprocally to that end. Furthermore, the spool valves 60 and 76 regulate fluid or air flow therethrough in order to shift or regulate the various components of the tapping device as will be hereinafter explained in detail.

The general construction and operation of the various fluid control components will be most clearly understood by an explanation of the overall operation of the tapping device of the present invention so that the only description required at this time prior to said operational description is of certain detailed portions of construction and fluid connection for a more clear understanding of said components.

The main fluid control spool valve 60 is shown in the off position in FIG. 3 blocking the flow of fluid or air from the main fluid inlet 58 through the governor orifice part 72, and is shown in the on position in FIG. 6 directing the air therethrough and through the governor orifice part A fluid bleed line 82 and a manually operable emergency stop valve 84 are connected at one end of the main fluid control spool valve 60 as best seen in FIG. 6, while a manually operable start valve 86 is connected to the other end of said spool valve. The fluid bleed line 82 extends from the spool valve 60 to a main bleed valve 88 positioned rearwardly aligned with and engageable for actuation by the spindle 12 and lead screw 14, said main bleed valve being normally closed when not engaged and being opened when engaged to permit the bleeding of air therethrough to the atmosphere.

Still referring to FIG. 6, the reversing fluid control spool valve 76 is connected for a main supply of air through supply line 90 communicating with the main fluid inlet 58, said air passing through spool valve 76 into a clutch feed line 92 when said spool valve is in a feed position and into both a clutch retraction line 94 and a governor line 96 when said spool valve is in a retraction position. One end of the reversing fluid control spool valve 76 is connected through a fluid bleed line 98 to the previously described main bleed valve 88 for control thereby in the same manner as described. The opposite end of this spool valve 76 is normally maintained closed by a spring urged ball valve 100.

The reverse control rod 78 is normally urged rearwardly to a stationary position by the ball valve 100 which engages a forward end of said control rod, but said control rod is reciprocally movable forwardly to open the ball valve 100 upon forward axial urging thereof. A selectively adjustable reversing collar 102 is threadably engaged with the reverse control rod 78 and extends into interference engagement with a radial flange 104 of the lead screw 14 when the lead screw and spindle 12 are at their maximum extended or feed limit, such limit being determined by the selective adjustment of the collar 102 on the rod 78. Also a manually operable emergency retraction control 106 is mounted rearwardly of and aligned with the reverse control rod 78, said emergency retraction control being selectively manually actuated to move the reverse control rod forwardly at any time to, in turn, open the ball valve 100 despite the position of the spindle 12 and lead screw 14.

The clutch control assembly generally indicated at 80 includes an enlarged, cylindrical sealing member 108 axially stationary on the countershaft 34 between the clutch driving member 42 and the clutch feed gear 36 forming a retraction fluid chamber 110 between this sealing member and the clutch driving member. Furthermore, a sealing member 112 is positioned axially stationary between the clutch driving member 42 and the clutch retraction gear 38 forming a feed fluid chamber 114 between this sealing member and the clutch driving member. The sealing members 108 and 112 are rotatable with the countershaft 34 and the clutch driving member 42 but the clutch driving member is axially slidable relative to each.

Also, the feed fluid chamber 114 communicates with the fluid clutch feed line 92 and the retraction fluid chamber 110 communicates with the fluid clutch retraction line 94, both through the countershaft 34. Thus, when fluid is directed through the clutch feed line 92 into the feed fluid chamber 114, the clutch driving member 42 is urged axially into engagement with the clutch feed gear 36, and when fluid is directed through the clutch retraction line 94 into the retraction fluid chamber 110, the clutch driving member is urged axially into engagement with the clutch retraction gear 38. The feed positioning of the clutch driving member 42 is shown in FIGS. 5 and 6, and the retraction positioning of the clutch driving member is shown in FIG. 1.

In operation of the tapping device of the present invention, prior to the start of the tapping operation, the spindle 12 and lead screw 14 are fully rearwardly retracted within the housing 10 and the main fluid control spool valve 60 is in the position shown in FIG. 3 so as to block the main supply of fluid from the main fluid inlet 58 to the governor orifice part 72 and the fluid drive motor 56. The operation of the tapping device is commenced by depressing the start valve 86 which bleeds air from that end of the main fluid control spool valve 60 shifting the spool thereof to the opposite end shown in FIG. 6 permitting the flow of air through the governor orifice part 72 and to the fluid drive motor 56. At the termination of the preceding operating cycle and as will be hereinafter more fully explained, the main bleed valve 88 has been actuated by the rearward movement of the spindle 12 and lead screw 14 to bleed air from the left-hand side of the reversing fluid control spool valve 76 moving the spool thereof to that left-hand end and directing air through the clutch feed line 92 into the feed fluid chamber 114 positioning the clutch driving member 42 engaged with the clutch feed gear 36 as shown in FIG. 6.

The start of rotation of the fluid drive motor 56, therefore, rotates the countershaft 34, the clutch driving member 42, the clutch feed gear 36 and the spindle feed gear 30 to rotate the spindle 12 and lead screw 14 through the sleeve 28, thereby beginning the feed stroke of the spindle and lead screw forwardly from the housing 10. During the feed stroke, the various fluid control components remain in the positions of FIG. 6. Furthermore, during this feed stroke, no air is being transmitted from the reversing fluid control spool valve 76 through the governor line 96 so that the governor orifice part 72 is in its forward speed control position with the air therethrough being regulated by the governor reciprocal control part 64 retaining the fluid drive motor 56 under control of the governor 62 at a constant reduced speed for the feed stroke. Although the spindle retraction gear 32, the idler gear 40 and the clutch retraction gear 38 are being reversely rotated during this feed stroke, the clutch retraction gear is not engaged with the clutch driving member 42 so as to reversely rotate freely on the countershaft 34.

At the forward end of the feed stroke of the spindle 12 and lead screw 14, the lead screw flange 104 engages the reversing collar 102 of the reverse control rod 78 carrying this control rod forwardly to open the ball valve 100, thereby bleeding the air from that end of the reversing fluid control spool valve 76 causing the spool thereof to shift to the right as shown in FIG. 1. Such shifting of the reversing fluid control spool valve 76 cuts off air through the clutch feed line 92 to the clutch feed fluid chamber 114 and directs air through both the clutch retraction line 94 to the clutch retraction fluid chamber 110 and through the governor line 96 to a governor chamber 116 forwardly of a sealing member 118 on the governor orifice part 72. Air directed into the clutch retraction fluid chamber 110 forces the clutch driving member 42 axially rearwardly to disengage the clutch feed gear 36 and drivingly engage the clutch retraction gear 38 as shown in FIG. 1, and also air within the governor chamber 116 forces the governor orifice part 72 rearwardly to its rearward noncontrolling position by virtue of pressure against the sealing member 118.

The direction of rotation of the spindle 12 and lead screw 14 is, therefore, reversed in view of the reverse rotational driving of the spindle retraction gear 32 through the idler gear 40, the clutch retraction gear 38 and the clutch driving member 42 by the fluid drive motor 56 and the countershaft 34. This reverse rotation of the spindle 12 and lead screw 14 causes the start of rearward retraction of this spindle and lead screw in the retraction stroke. With the governor orifice part 72 in its rearward noncontrolling position spaced rearwardly from affect by the governor reciprocal control part 64, the fluid drive motor 56 is driven at maximum high speed causing the spindle 12 and lead screw 14 to be driven at high speed and the retraction stroke to be a high speed stroke. Furthermore, during this retraction stroke, the spindle feed gear 30 is reversely rotated and consequently reversely rotates the clutch feed gear 36 which rotates freely on the countershaft 34 due to lack of engagement by the clutch driving member 42.

The spindle 12 and lead screw 14 continue rearwardly in their retraction stroke until the lead screw actuates the main bleed valve 88 which causes bleeding of air from the left-hand end of the reversing fluid control spool valve 76 through the fluid bleed line 98 and from the upper end (FIG. 6) of the main fluid control spool valve 60, shifting the spools of both valves to these respective ends. The reversing fluid control spool valve 76, therefore, cuts off air to the clutch retraction fluid chamber 110 through the clutch retraction line 94 and feeds air to the clutch feed fluid chamber 114 through the clutch feed line 92 repositioning the clutch driving member 42 engaged with the clutch feed gear 36 and ready for the start of the next feed stroke. The reversing fluid control spool valve 76 also cuts off air to the governor chamber 116 permitting the governor orifice part 72 to return to its forward speed control position ready for the next feed stroke. The shifting of the main fluid control spool valve 60 to the position shown in FIG. 3 cuts off the air through the governor orifice part 72 to the fluid drive motor 56 stopping rotation of the spindle 12 and lead screw 14.

Thus, the tapping device of the present invention is now in position ready for the start of another feed stroke which may be commenced as before by depressing the start valve 86. If, at any time during the feed or retraction stroke, it is desired to immediately stop rotation and axial movement of the spindle 12 and lead screw 14, it is merely necessary to depress the emergency stop valve 84 which bleeds air from the top end of the main fluid control spool valve 60 as shown in FIG. 6 or the right-hand end thereof as shown in FIG. 3 shifting the valve spool to its stop position and cutting off air to the fluid drive motor 56 as previously described. Also, at any time during the feed stroke of the spindle 12 and lead screw 14 that it is desired to immediately begin retraction of said spindle and lead screw, it is merely necessary to actuate the emergency retraction control 106 which forces the reverse control rod 78 forwardly to open the ball valve 100 and cause shifting of the reversing fluid control spool valve 76 to thereby place all of the fluid control components in proper position for carrying out the remainder of the retraction stroke of the spindle 12 in housing 10 as previously described.

According to the present invention, therefore, a tapping device is provided wherein a spindle 12 driving a usual tap is positively driven in both feed and retraction strokes so as to not only cut the threads with the tap during the feed stroke, but also to retract the tap from the threads without the application of any forces on said cut threads which could either tear or deform the same. Furthermore, this unique positive feed and retraction driving is accomplished in an efficient and simplified manner reducing the overall size of the tapping device unit so that the same may be used in a wide variety of tapping jobs. Still further, with the tapping device of the present invention, the tapping speed is governor controlled throughout the feed stroke while the threads are being cut and is automatically shifted to high speed during the retraction stroke so as to carry out the tapping operation in a minimum amount of time despite the positive driving in both the feed and retraction strokes. Still additionally, a simple and efficient form of automatic fluid control is provided for the tapping device which is positive in action and virtually trouble-free, and such automatic control may be integrated therein both an emergency stop and an emergency retraction return for the maximum of safety and convenience.

I claim:

1. In a positive feed and positive retract tapping device, the combination of: a housing; a tap mounting spindle rotatably and axially movably mounted in said housing; a lead screw rotatably mounted in said housing; spindle connection means operably connecting said lead screw to said spindle for positive axial movement of said spindle in a forward feed stroke relative to said housing upon rotation of said spindle in one direction and positive axial movement of said spindle in a rearward retraction stroke relative to said housing upon rotation of said spindle in an opposite direction; feed drive gear means and retraction drive gear means each rotatably mounted axially stationary in said housing and each constantly operably connected to said spindle free of said lead screw for rotating said spindle alternately in said one and opposite directions while permitting said spindle feed stroke and retraction stroke axial movement, one of said feed drive gear means and said retraction drive gear means having an even plural number of constantly rotatably connected gears including at least two gears, the other of said feed drive gear means and said retraction drive gear means having an odd plural number of constantly rotatably connected gears including at least three gears; a drive motor driving in a single rotational direction; and clutch means shiftable to a feed position operably connecting said drive motor to said feed drive gear means for rotating said spindle in said one direction and shiftable to a retract position operably connecting said drive motor to said retraction drive gear means for rotating said spindle in said opposite direction.

2. A tapping device as defined in claim 1 in which each of said feed drive gear means gears and retraction drive gear means gears include a spindle gear constantly spline connected to said spindle rotatably driving said spindle while permitting said spindle axial movement; in which said operable connection between said clutch means and said drive motor includes a countershaft rotatably mounted axially stationary in said housing and operably connected to said drive motor rotatable in a single direction; in which said clutch means includes a clutch driving member mounted on said countershaft rotatable with said countershaft in said countershaft single direction while being axially shiftable on said countershaft between said clutch means feed and retract positions; in which each of said feed drive gear means gears and said retraction drive gear means gears include a clutch gear rotatably mounted axially stationary in said housing axially aligned with said countershaft and clutch driving member; and in which said clutch means includes driven means operably connecting said clutch driving member to said clutch gear of said feed drive gear means rotatably driving said clutch gear in said single direction when said clutch means driving member is shifted to said feed position and operably connecting said clutch driving member to said clutch gear of said retraction drive gear means rotatably driving said clutch gear in said single direction when said clutch means driving member is shifted to said retract position.

3. A tapping device as defined in claim 1 in which each of said feed drive gear means and said retraction drive gear means includes a portion of a spindle drive sleeve telescoped over said spindle spline connected to said spindle and axially stationary in said housing rotatably driving said spindle while permitting axial movement of said spindle relative thereto, one of said gears being a spindle gear on said sleeve telescoping said spindle and rotatably driving said sleeve; in which said operable connection between said clutch means and said drive motor includes a countershaft rotatably mounted axially stationary in said housing and having the axis thereof generally parallel to said spindle, said countershaft being driven in a single direction of rotation by said drive motor; in which said clutch means includes a driving member spline connected telescoped over said countershaft rotatable with said countershaft in said single direction, said spline connection permitting axial shifting of said clutch driving member; in which each of said feed drive gear means gears and said retraction drive gear means gears include a clutch gear rotatably mounted axially stationary in said housing axially aligned with said countershaft and said clutch driving member; and in which said clutch means includes clutch driven means operably connecting said clutch driving member and said clutch gear of said feed drive gear means rotatably driving said clutch gear in said single direction when said clutch driving member is axially shifted to said clutch means feed position and operably connecting said clutch driving member to said clutch gear of said retraction drive gear means rotatably driving said clutch gear in said single direction when said clutch driving member is shifted to said clutch means retract position.

4. A tapping device as defined in claim 1 in which said drive motor is a fluid driven drive motor driving in a single rotational direction; in which governor means is operably connected to said drive motor and includes fluid orifice means in said housing supplying fluid for driving said drive motor and shiftable axially between a governor controlling position and noncontrolling position, a speed regulating member operably connected constantly rotatable with said drive motor and maintaining fluid flow through said orifice means at a generally constant level by moving toward and away from said orifice means according to speed increases and decrease of said drive motor when said orifice means is shifted to said drive motor controlling position toward said speed regulating member maintaining said drive motor at a generally constant rotatable speed, said speed regulating member being substantially free of affecting speed of said drive motor when said orifice means is shifted to said drive motor noncontrolling position away from said speed regulating member, connection means operably connected between said clutch means and said governor means for shifting said orifice means to said drive motor controlling position toward said speed regulating member when said clutch means is shifted to said feed position and shifting said orifice means to said drive motor noncontrolling position away from said speed regulating member when said clutch means is shifted to said retract position.

5. A tapping device as defined in claim 1 in which each of said feed drive gear means and said retraction drive gear means includes a portion of a spindle drive sleeve telescoped over said spindle connected to said spindle and axially stationary in said housing rotatably driving said spindle while permitting axial movement of said spindle relative thereto, one of said gears being a spindle gear on said sleeve telescoping said spindle and rotatably driving said sleeve; in which said operable connection between said clutch means and said drive motor includes a countershaft rotatably mounted axially stationary in said housing and having the axis thereof generally parallel to said spindle, said countershaft being driven in a single direction of rotation by said drive motor; in which said clutch means includes a driving member spline connected telescoped over said countershaft rotatable with said countershaft in said single direction, said spline connection permitting axial shifting of said clutch driving member; in which each of said feed drive gear means gears and said retraction drive gear means gears include a clutch gear rotatably mounted axially stationary in said housing axially aligned with said countershaft and said clutch driving member; in which said clutch means includes clutch driven means operably connecting said clutch driving member and said clutch gear of said feed drive gear means rotatably driving said clutch gear in said single direction when said clutch driving member is axially shifted to said clutch means feed position and operably connecting said clutch driving member to said clutch gear of said retraction drive gear means rotatably driving said clutch gear in said single direction when said clutch driving member is shifted to said clutch means retract position; and in which governor means is operably connected to said drive motor shiftable to a controlling position maintaining speed of said drive motor at a generally constant level and shiftable to a noncontrolling position free of affecting drive motor speed, said governor means including connection means operably connected between said clutch means for shifting said governor means to said controlling position upon shifting of said clutch means to said feed position and shifting said governor means to said noncontrolling position upon shifting of said clutch means to said retract position.

6. In a positive feed and positive retract tapping device, the combination of: a housing; a tap mounting spindle rotatably and axially movably mounted in said housing; a lead screw rotatably mounted in said housing; spindle connection means operably connecting said lead screw to said spindle for positive axial movement of said spindle in a forward feed stroke relative to said housing upon rotation of said spindle in one direction and positive axial movement of said spindle in a rearward retraction stroke relative to said housing upon rotation of said spindle in an opposite direction; axially stationary feed gear and retraction gear assemblies in said housing each having a plurality of constantly engaged gears including a rotatable spindle gear constantly operably connected to said spindle free of said lead screw rotating said spindle upon rotation of said spindle gear while permitting axial movement of said spindle and a rotatable clutch gear constantly operably engaged with said spindle gear, one of said feed gear and retraction gear assemblies having an even number of constantly engaged gears including at least said spindle and clutch gears, the other of said feed gear and retraction gear assemblies having an odd number of constantly engaged gears including said spindle and clutch gears and at least one additional gear engaged therebetween; a drive motor driving in a single rotational direction; and clutch means shiftable to a feed position operably connecting said drive motor to said clutch gear of said feed gear assembly for rotating said spindle in said one direction and shiftable to a retract position operably connecting said drive motor to said clutch gear of said retraction gear assembly for rotating said spindle in said opposite direction.

7. A tapping device as defined in claim 6 in which said operable connection between said clutch means and said drive motor includes a countershaft rotatably mounted axially stationary in said housing operably connected to said drive motor rotatable in a single direction, said clutch gears of said feed gear and retraction gear assemblies being mounted axially aligned with said countershaft and axially spaced from each other, said clutch means being telescoped over said countershaft operably connected to said countershaft rotatable in said countershaft single direction shiftable between said feed and retract positions alternately operably connecting said drive motor to said clutch gears of said feed gear and retraction gear assemblies rotating said clutch gears in said countershaft single direction.

8. A tapping device as defined in claim 6 in which said lead screw is rotatably mounted in said housing secured rotatable and axially movable with said spindle upon rotation of said spindle in said one and opposite directions; and in which stationary nut means is mounted in said housing constantly threadably engaged with said lead screw for moving said lead screw and spindle axially upon rotation of said spindle.

9. A tapping device as defined in claim 6 in which said operable connection between said clutch means and said drive motor includes a countershaft rotatably mounted axially stationary in said housing operably connected to said drive motor rotatable in a single direction, said clutch gears of said feed gear and retraction gear assemblies being mounted axially aligned with said countershaft and axially spaced from each other, said clutch means being telescoped over said countershaft operably connected to said countershaft rotatable in said countershaft single direction shiftable between said feed and retract positions alternately operably connecting said drive motor to said clutch gears of said feed gear and retraction gear assemblies rotating said clutch gears in said countershaft single direction; and in which said lead screw is rotatably mounted in said housing secured rotatable and axially movable with said spindle upon rotation of said spindle in said one and opposite directions; and in which stationary nut means is mounted in said housing constantly threadably engaged with said lead screw for moving said lead screw and spindle axially upon rotation of said spindle.

10. A tapping device as defined in claim 6 in which said operable connection between said clutch means and said drive motor includes a countershaft rotatably mounted axially stationary in said housing operably connected to said drive motor rotatable in a single direction, said clutch gears of said feed gear and retraction gear assembles being mounted axially aligned with said countershaft and axially spaced from each other, said clutch means being telescoped over said countershaft operably connected to said countershaft rotatable in said countershaft single direction shiftable between said feed and retract positions alternately operably connecting said drive motor to said clutch gears of said feed gear and retraction gear assemblies rotating said clutch gears in said countershaft single direction; in which said drive motor is a fluid driven drive motor driving in a single direction; in which governor means is operably connected to said drive motor for controlling fluid to said drive motor to control speed of said drive motor within a predetermined range when said clutch means is in said feed position and being free of effectively controlling fluid to said drive motor when said clutch means is in said retract position, said governor means including orifice means for supplying fluid to said drive motor and speed regulating means automatically increasing and decreasing fluid flow through said orifice means according to drive motor speed decreases and increases when said clutch means is in said feed position; and in which said feed gear and retraction gear assemblies each include a portion of a common sleeve telescoped spline connected to said spindle, said spindle gears being operably connected to said sleeve telescoping said spindle and directly rotatably driving said sleeve to drive said spindle through said sleeve spline connection when said spindle gears are rotated.

11. A tapping device as defined in claim 6 in which said lead screw is rotatably mounted in said housing secured rotatably and axially movable with said spindle upon rotation of said spindle in said one and opposite directions; and in which stationary nut means is mounted in said housing constantly threadably engaged with said lead screw for moving said lead screw and spindle axially upon rotation of said spindle, said stationary nut means being mounted in said housing for limited combined axial and radial movement relative to said housing, resilient means operably connected between said stationary nut means and said housing and constantly axially and radially urging said stationary nut means toward said lead screw into said threadable engagement with said lead screw.